United States Patent [19]

Hayden

[11] Patent Number: 4,547,944

[45] Date of Patent: Oct. 22, 1985

[54] TUBE-IN-SHELL HEAT EXCHANGERS

[75] Inventor: Owen Hayden, Bolton, England

[73] Assignee: National Nuclear Corporation Limited, London, England

[21] Appl. No.: 585,450

[22] Filed: Mar. 2, 1984

[51] Int. Cl.⁴ .......................... B23P 15/26; B23P 7/00
[52] U.S. Cl. .............. 29/402.09; 29/402.16; 29/157.3 C; 29/157.4; 165/76; 165/83
[58] Field of Search .............. 29/157.3 AH, 157.3 A, 29/157.3 B, 157.3 C, 727, 726, 157.4, 402.01, 402.02, 402.09, 402.11, 402.13, 402.16; 165/83, 76

[56] References Cited

U.S. PATENT DOCUMENTS

| 1,095,477 | 5/1914 | Still | 29/157.3 A |
| 1,594,199 | 7/1926 | Heineman | 165/83 |
| 2,209,974 | 8/1940 | Jacobus | 165/76 |
| 2,267,315 | 12/1941 | Stickeleather | 29/157.3 B |
| 3,070,130 | 12/1962 | Risley | 29/402.02 |
| 4,449,280 | 5/1984 | Schroeder | 29/157.3 C |

FOREIGN PATENT DOCUMENTS

| 629534 | 5/1936 | Fed. Rep. of Germany | 29/157.3 A |
| 3320164 | 12/1983 | Fed. Rep. of Germany | 29/157.3 C |
| 1026716 | 2/1953 | France | 165/83 |
| 26633 | 3/1981 | Japan | 29/157.3 C |
| 58-932 | 4/1982 | Japan | 29/157.3 C |
| 1285511 | 8/1972 | United Kingdom | 28/157.3 C |

Primary Examiner—Howard N. Goldberg
Assistant Examiner—Vernon K. Rising
Attorney, Agent, or Firm—William R. Hinds

[57] ABSTRACT

A method of repairing a defective tube in a tube-in-shell heat exchanger which entails inserting within the defective tube a tubular sleeve and sealingly bonding the end regions of the sleeve to the tube to bridge the defect, the tubular sleeve having axial flexibility (for example by being circumferentially corrugated). The sleeve may be mechanically keyed to the tube at positions adjacent to the bonding at the end regions of the sleeve.

19 Claims, 1 Drawing Figure

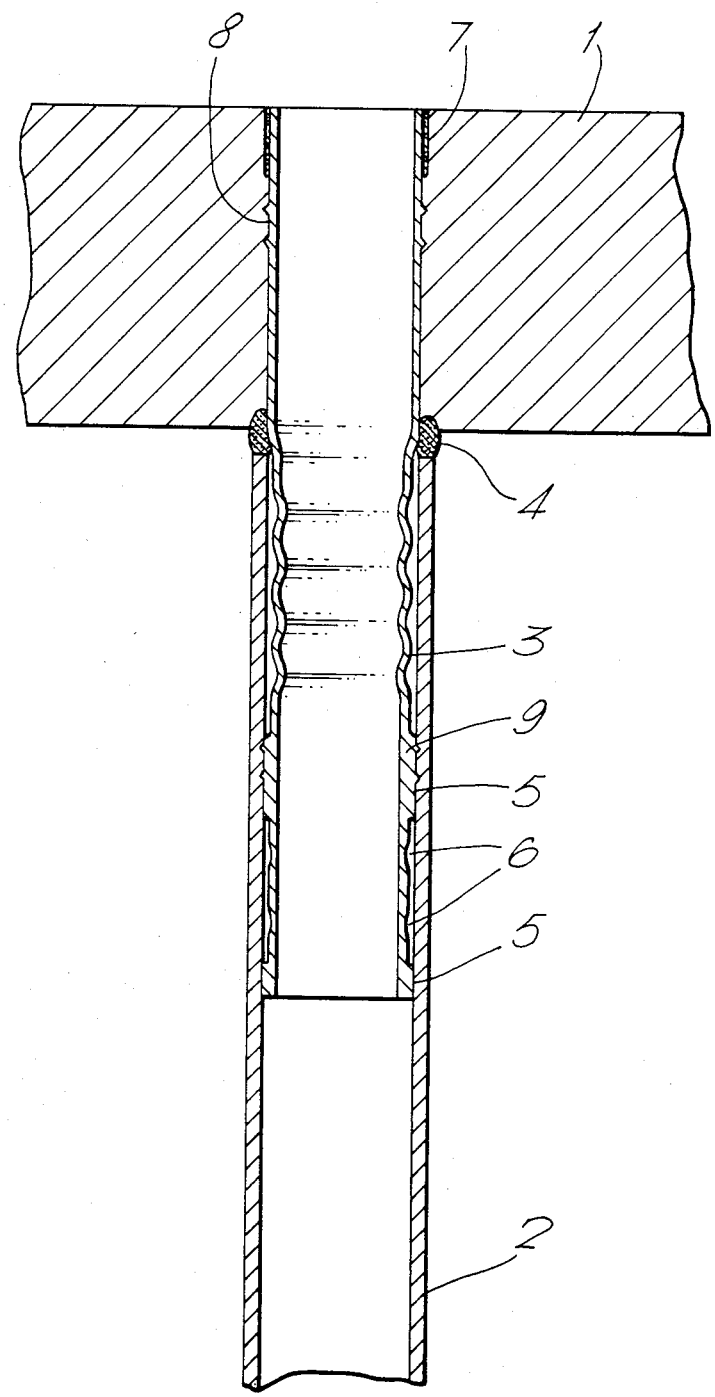

TUBE-IN-SHELL HEAT EXCHANGERS

This invention relates to tube-in-shell heat exchangers.

A heat exchanger of the tube-in-shell kind comprises a shell having at least one tube sheet into which open ended tubes are welded. In use a first fluid is passed through the tubes whilst a second fluid is passed through the shell to effect heat transfer between the fluids. When a leak develops in a tube it is common practice to make the tube redundant by plugging it but where numerous tubes are made redundant the heat exchanger loses efficiency and it is obviously advantageous to provide a method of repairing defective heat exchanger tubes instead of plugging them.

Our British Patent Specification No. 2,032,559A discloses a method of repairing a defective tube in a tube-in-shell heat exchanger which consists of inserting a tubular sleeve within the defective tube and sealingly bonding the end regions of the sleeve to the tube and the tube sheet to bridge the defect. Whilst generally acceptable under normal operating conditions, the repairs may be suspect under temperature transient conditions, due to the rigidity of the sleeves causing loading of the end joints beyond a safe amount.

According to the present invention, a method of repairing a defective tube in a tube-in-shell heat exchanger comprises inserting within the defective tube a tubular sleeve and sealingly bonding the end regions of the sleeve to the tube to bridge the defect, wherein the tubular sleeve possesses either one or a combination of both of the following features: axial flexibility, and being mechanically keyed to the tube at positions adjacent to the said bonding at the end regions of the sleeve.

The said axial flexibility may be provided by circumferentially corrugating the sleeve at a plurality of positions along its length.

The said mechanical keying may be effected by rolling or otherwise expanding the material of the sleeve into tight engagement, with or without grooving, with the tube or tubesheet.

The said bonding between sleeve and tube may be explosive welds at each end, or an explosive weld at one end and a brazed joint at the other end.

Typically if a temperature down transient should occur, a rigid sleeve will appear to shrink and will place the end joints under severe strain. However, with axial flexibility, the sleeve can contract axially and relieve the load on the end joints sufficiently for there to be confidence that they will retain their integrity.

Where circumferential corrugations are employed, they flex and tend to act like bellows and allow the necessary axial movement. Care must be taken in the sleeve design to ensure that the shrinkage strains on a temperature down transient (or the expansion strains on a temperature up transient) are not allowed to concentrate upon a particular thinned section which would provide weakness and a failure point. Constant wall thickness throughout the sleeve should be maintained.

Where mechanical keying is employed without axial flexibility of the sleeve, it is intended that the keying can absorb the axial contraction/expansion loading referred to in the preceding paragraph, so as to relieve the loading on the said end joints.

Obviously, the combination of axial flexibility and mechanical keying increases confidence in the integrity of the repair in the face of temperature transients.

The invention includes a tube-in-shell heat exchanger when repaired by a method as set forth hereinbefore.

A method according to the invention of repairing a tube of a tube-in-shell heat exchanger is described by way of example, with reference to the sole accompanying drawing which is a fragmentary sectional view.

In the drawing there is shown a tube sheet 1 and tube 2 of a tube-in-shell heat exchanger for effecting heat transfer between liquid metal flowing through the shell and water flowing through the tubes. There is a multiplicity of the tubes 2 each of which is sealed to the tube sheet by welding. In use some of the tube to tube sheet welds become defective and in order to avoid making them redundant by plugging, a tubular sleeve 3 is inserted within each tube having a defective weld 4 the sleeve being sealably bonded at one end region to the tube and the other end region to the tube sheet thereby bridging the defective weld.

The sleeve 3 has a number of circumferential corrugations which can act like bellows and allow axial expansion in the event of a temperature transient occurring.

The lower end region of the sleeve 3 shown in the drawing is bonded to the tube by high temperature brazing and the upper end region to the tube sheet by explosive welding. The lower end region of the sleeve is formed with two lands 5 of such outside diameter that there is adequate clearance for the lands to slide freely into the tube. Intermediate the lands there are two grooves 6 for containing braze material which is formed of generally toroidal shape to engage the grooves in the manner of circlips prior to insertion of the sleeve in the tube. Also prior to inserting the sleeve in the tube, the inside wall of the tube and the bore of tube aperture in the tube sheet are both cleaned and, after insertion of the sleeve, the lower end is expanded radially outwardly by roll swaging to bring the lands almost into contact with the tube wall thereby providing a capillary clearance between the lands of the sleeve and the tube for melted braze material, the swaging tool, of course, being inserted from above the tube sheet.

The brazing head for effecting the bond comprises a radio frequency induction heating coil which is positioned within the bore of the sleeve in the region of the required braze. A second heating coil of greater length is used for tempering the joint after brazing. The brazing equipment incorporates a feedback system into which a milli-voltage signal from a sensing device can be used automatically to control the brazing cycle. The sensing device is a thermocouple but it is envisaged that a more suitable sensing device could be developed using fibre optics to measure the temperature changes, a light guide being fed down a supply tube provided for conducting the electrical leads and cover gas tubing for the brazing operation.

The upper end of the sleeve is explosively welded at 7 to the tube sheet by detonating a charge of explosive material disposed within the sleeve to violently expand the sleeve radially into abutment with the bore of the tube aperture in the tube sheet, thereby metallurgically bonding the sleeve to the tube sheet.

In an alternative method the inside wall of the tube and the bore of the tube aperture in the tube sheet are cleaned prior to bonding by an electro-erosion technique, this being a technique whereby material is removed from the bonding surfaces of the tube and tube sheet by means of repetitive short-lived electric sparks between the surface and an electrode inserted within the bore of the tube and tube sheet, or by an electrochemical technique.

In another alternative, the brazed joint is replaced by an explosive weld, the grooves for braze material not then needing to be provided.

Instead of or in addition to the sleeve being provided with axial flexibility the sleeve can be mechanically keyed to the tubeplate and tube at its ends 8, 9 just inboard of the bonded joints. At these positions the keying may, for example, be effected by the sleeve being rolled into small grooves cut into the tubeplate and/or tube wall or in another example rely on a very tight contact expansion force applied from within the sleeve. If an expansion process is used to produce the required braze bonded joint fit gap, this will often produce the said keying in effect by bulging of the tube plus sleeve just above the braze area.

I claim:

1. A method of repairing a defective tube in a tube sheet of a tube-in-shell heat exchanger, which method comprises inserting within the defective tube a tubular sleeve, and sealingly bonding spaced end regions of the sleeve to the tube sheet and the tube to bridge the defect, wherein, the improvement comprises an unbonded portion of the tubular sleeve defining a plurality of circumferential corrugations lying between the bonded end regions so as to possess axial flexibility.

2. A method according to claim 1, wherein the corrugations are positioned so as to locate in the tube.

3. A method according to claim 2, including mechanically keying the sleeve to the tube sheet and the tube, adjacent to the said bonding at the end regions.

4. A method according to claim 3, wherein the said mechanical keying is effected by expanding the material of the sleeve into tight engagement with the tube and the tube sheet after the bonding of the end regions.

5. A method according to claim 3, including cutting relatively small circumferential grooves in the inside wall of the tube, and expanding the material of the sleeve into said grooves, the expansion of the sleeve mechanically keying the sleeve in the grooves.

6. A method according to claim 5, wherein the grooves are of triangular cross-section.

7. A method according to claim 3, including cutting relatively small circumferential grooves in the inside surface of an opening for the tube in the tube sheet and expanding the material of the sleeve into said grooves, thereby mechanically keying the sleeve in said grooves.

8. A method according to claim 7, wherein said grooves are of triangular cross-section.

9. A method according to claim 3, wherein the said bonding between the sleeve, the tube sheet and the tube are explosion welds at each end region.

10. A method according to claim 3, wherein the said bonding between the sleeve, the tube sheet, and the tube, is an explosion weld at the tube sheet and a brazed joint at the tube.

11. A tube-in-shell heat exchanger which has been repaired by a method according to claim 1.

12. A tube-in-shell heat exchanger which has been repaired by a method as claimed in claim 1, and comprising a tube sheet having at least one open-ended tube connected to the tube sheet in flow communication with an opening through the tube sheet, the tube having a defect, a tubular sleeve within the tube sheet and the defective tube and sealingly bonded at its end regions to said tube sheet and said tube at locations such that the sleeve bridges the defect, an unbonded portion of the sleeve between said bonded end regions being formed with a plurality of circumferential corrugations so as to possess axial flexibility between said bonded end regions.

13. A tube-in-shell heat exchanger as claimed in claim 12 wherein the corrugations are located within the tube.

14. A tube-in-shell heat exchanger as claimed in claim 12 wherein said sleeve is mechanically keyed to the tube sheet and the tube adjacent to said bonded end regions but outwardly of said circumferential corrugations.

15. A tube-in-shell heat exchanger as claimed in claim 14 wherein said mechanical keying comprises sleeve material expanded into small circumferential grooves cut in the inside wall of said tube.

16. A tube-in-shell heat exchanger as claimed in claim 14 wherein said mechanical keying comprises sleeve material expanded into small circumferential grooves cut in said opening in the tube sheet.

17. A method of repairing a defective tube in a tube sheet of a tube-in-shell heat exchanger, which method comprises inserting within the defective tube a tubular metal sleeve, and sealingly bonding spaced end regions of the sleeve to the tube to bridge the defect, wherein the improvement comprises, (a) cleaning regions of the tube and of the tube-sheet by an electro-erosion technique, said regions being opposite to where the end regions of the sleeve are to locate therein;

(b) cutting relatively small circumferential grooves in the tube and the tube sheet inboard of and adjacent to where the end regions of the sleeve are to locate;

(c) inserting through the tube sheet and the tube a metal sleeve having a plurality of circumferential corrugations therearound; said corrugations being formed inwardly of the end regions so as to locate in the tube between the tube sheet and the grooves in the tube, and the sleeve having braze material thereon;

(d) expanding the end region of the sleeve remote from the tube sheet to define a capillary clearance between the tube;

(e) heating by an induction heating coil the said remote end of the sleeve, so as to effect a brazed joint thereat;

(f) forming an explosion welded joint between the tube sheet and the adjacent end region of the sleeve;

(g) and expanding the sleeve into the grooves at the regions of the grooves in the tube sheet and the tube, so as to mechanically key the sleeve to the tube sheet and to the tube.

18. A method according to claim 17 wherein the grooves are of triangular cross-section.

19. A tube-in-shell heat exchanger which has been repaired by a method according to claim 17.

* * * * *